United States Patent [19]

Hayes et al.

[11] Patent Number: 4,652,327

[45] Date of Patent: Mar. 24, 1987

[54] BONDING POLY(VINYLIDENE CHLORIDE)

[75] Inventors: Kathryn S. Hayes, Norristown, Pa.; Charles R. Frihart, Lawrenceville, N.J.

[73] Assignee: Union Camp Corporation, Wayne, N.J.

[21] Appl. No.: 714,851

[22] Filed: Mar. 22, 1985

[51] Int. Cl.$^4$ .......................... B32B 31/30; C09J 3/14
[52] U.S. Cl. .......................... 156/244.22; 156/330.9; 427/412.4; 428/476.3; 528/339.3
[58] Field of Search .... 156/330.9, 244.22; 427/412.4; 428/476.3; 528/339.3

[56] References Cited

U.S. PATENT DOCUMENTS

| | | | |
|---|---|---|---|
| 3,377,303 | 4/1968 | Peerman et al. | 528/339.3 |
| 3,449,273 | 6/1969 | Kettenring et al. | 528/339.3 |
| 3,738,950 | 6/1973 | Sturwold et al. | 528/339.3 |

Primary Examiner—John J. Gallagher
Attorney, Agent, or Firm—Kane, Dalsimer, Kane, Sullivan and Kurucz

[57] ABSTRACT

The invention discloses the use of dimer based polyamide compositions as hot melt adhesives for poly(vinylidene chloride).

8 Claims, No Drawings

BONDING POLY(VINYLIDENE CHLORIDE)

BACKGROUND OF THE INVENTION

1. Field of the Invention

The invention relates to methods of bonding poly(vinylidene chloride) and more particularly relates to a method employing a polyamide hot-melt adhesive.

2. Brief Description of the Prior Art

The prior art is replete with descriptions of polyamide compositions having hot-melt adhesive properties and the methods of their preparation. Representative of the prior art adhesive compositions are those described in U.S. Pat. Nos. 3,377,303 and 3,444,026. The latter compositions comprise the reaction product of a dimer fatty acid and a wide variety of diamines. The compositions described are known to be adhesives for bonding vinyl based polymeric resins.

Polyamide compositions useful as hot-melt adhesives for adhering vinyl plastics are also disclosed in U.S. Pat. No. 3,847,875. The latter compositions are the reaction product of 1,8- or 1,9-heptadecane dicarboxylic acid and specific heterocyclic diamines such as piperazine.

In spite of the availability of a wide variety of polyamide hot-melt adhesives, there has remained a need for a satisfactory method of bonding poly(vinylidene chloride) resins. These particular resins are difficult to bond with hot melt adhesives because of their low melting point.

The present invention comprises the discovery that a certain class of polyamide hot-melt adhesive compositions may be used to effectively bond poly(vinylidene chloride) resins, with greater strength than is obtainable in bonding vinyl resins, such as poly(vinyl chloride).

SUMMARY OF THE INVENTION

The invention comprises a method of bonding a first poly(vinylidene chloride) to a member selected from the group consisting of a second poly(vinylidene chloride) or other polymers such as poly(vinyl chloride), polyethylene, and polypropylene, which comprises;

1. interposing between the first poly(vinylidene chloride) and the selected member, a molten form of a polyamide adhesive comprising the amidification product of:
   (a) from 10-90 equivalent percent of a compound selected from the group consisting of piperazine, 1,3-bis-(4-piperidyl)propane, 1-(2-aminoethyl)piperazine and mixtures thereof,
   (b) from 10-90 equivalent percent of a diamine of the formula $H_2NR_4NH_2$ where $R_4$ is selected from the group consisting of aliphatic, cycloaliphatic and aromatic hydrocarbon radicals having from 2 to 20 carbon atoms,
   (c) from 0-20 equivalent percent of a diamine of the formula $H_2NR_5NH_2$ where $R_5$ is selected from the group consisting of polyoxyalkylene radicals,
   (d) from 40-95 equivalent percent of polymeric fat acid having a dimeric fat acid content greater than by weight,
   (e) from 5-60 equivalent percent of a dicarboxylic acid selected from the group consisting of $R_2OOC-COOR_2$ and $R_2OOCR_3COOR_2$ where $R_2$ is selected from the group consisting of hydrogen, alkyl and aryl groups containing from 1-8 carbon atoms and $R_3$ is a divalent, aliphatic, cycloaliphatic or aromatic hydrocarbon radical having from 1 to 22 carbon atoms; and 2. allowing the molten adhesive to solidify, whereby the first poly(vinylidene chloride) and the selected member are bonded together.

The process of the invention is advantageous in allowing poly (vinylidene chloride) coated substrates to be successfully bonded with hot-melt adhesives, which have superior physical properties of both a high softening point and good tensile strength. In addition, the poly(vinylidene chloride)poly(vinylidene chloride) peel strengths are much higher than the peel strengths observed when the same hot-melt adhesives are used to bond poly(vinyl chloride) to itself.

DETAILED DESCRIPTION OF THE PREFERRED EMBODIMENTS OF THE INVENTION

The reactants employed to prepare the polyamide adhesive compositions used in the method of the invention are well known as are the methods of their preparation. The polymeric fatty acids (d), sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

|  | % BY WEIGHT |
|---|---|
| $C_{18}$ monobasic acids (monomer) | 0-5 |
| $C_{36}$ dibasic acids (dimer) | 60-95 |
| $C_{54}$ and higher polybasic acids (trimer) | 1-35 |

The relative ratios of monomer, dimer, and trimer in unfractionated polymeric fatty acids are dependent on the nature of the starting material and the conditions of polymerization. Methods for the polymerization of fatty acids are described, for example, in the U.S. Pat. No. 3,157,681. The polymeric fatty acids may be unhydrogenated or hydrogenated.

A wide variety of dicarboxylic acids may be employed in the preparation of the polyamides described above, including aliphatic, cycloaliphatic and aromatic dicarboxylic acids. Representative of such acids, which may contain from 2 to 22 carbon atoms, are oxalic, glutaric, malonic, adipic, succinic, suberic, sebacic, azelaic, pimelic, terephthalic, isophthalic, phthalic, naphthalene dicarboxylic acids and 1,4- or 1,3-cyclohexane dicarboxylic acids. Methods of preparing these preferred acids are well known, and they are readily available commercially.

Preferred dicarboxylic acids (e) employed in the invention are straight chain aliphatic diacids having at least 6 carbon atoms and more preferably 6 to 22 carbon atoms such as azelaic, sebacic, 1,18-octadecane dicarboxylic and 1,16-hexadecane dicarboxylic acids, the latter two being most preferred. It should be understood that use of the corresponding acid anhydrides, esters, and acid chlorides of these acids is included in the term "dicarboxylic acid".

The organic diamines (b) preferably employed in preparing the compositions used in the present invention may be one or more of the known aliphatic, cycloaliphatic or aromatic diamines having from about 2 to 20 carbon atoms. Preferred especially are the alkylene diamines. Illustrative of the preferred diamines are ethylene diamine, 1,3-diaminopropane, 1,4-diaminobutane, terephthalyl diamine, known as p-xylene diamine, 1,6-hexamethylene diamine, 4,4'-methylenebis(cyclohexylamine), 2,2-bis-(4-cyclohexylamine) propane, polyglycol diamines, isophorone diamine, isophthalyl diamine, known as m-xylene diamine, cyclohexanebis(methylamines), 1,4-bis-(2'-aminoethyl)benzene and 4,4'-methylenebis(cyclohexylamine). These diamine compounds are all prepared by well known methods and many are commercially available. Preferred particularly are the straight chain aliphatic diamines of 2 to 20 carbons atoms, especially ethylene diamine and hexamethylene diamine, and cycloaliphatic diamines, especially 4,4'-methylenebis(cyclohexylamine).

The technique and general method of polymerizing the mixed reactants is generally well known; see for example U.S. Pat. Nos. 3,484,339 and 3,377,303.

The polyamides used in the present invention may be prepared by charging a resin kettle with the reactants, in proportions as hereinafter described and heating the mixture to a temperature at which polymerization occurs. In general, heating of the reactants is to a temperature of from about 130° to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in a catalytic proportion. Representative of such catalysts is phosphoric acid. The heating of the reaction mixture may be carried out until a selected viscosity of the reaction mixture is reached, e.g. 1,000–100,000 cps at 195° C. and preferably 7,500–20,000 cps at 195° C. In addition, small amounts (0.1 to 10 eq. %) of a saturated linear carboxylic acid containing 5–20 carbons may be added to the mixture to control molecular weight and viscosity—such acids include for example stearic and palmitic acid.

The relative quantities of the reactants are selected so that substantially equivalent numbers of reactive carboxyl and amine groups are present in the reaction mixture to produce a neutral or balanced polyamide, i.e., the acid and amine numbers are substantially equal. Slight excesses of carboxyl or amine are acceptable but this ratio is preferably maintained between 0.9:1 and 1.1:1 so that acid and amine numbers will be less than 35 preferably less than 20. Amine and acid numbers may be measured by conventional titrimetric analytic technique and are usually given as equivalents (or meqs.) of potassium hydroxide per gram of product.

The polyamide hot-melt adhesive compositions described above are particularly useful to bond poly(vinylidene chloride) to itself or to other polymers, such as poly(vinyl chloride), polyethylene, polypropylene, polyesters and polyamides. Especially useful bonding is achieved in bonding films of these resins.

To carry out the method of the invention, the polyamide hot-melt adhesive is applied in a molten state to one or both of the surfaces to be bonded together. The surfaces are then brought together with the interposed adhesive in a molten form and the adhesive allowed to cool and solidify. Application of the hot-melt adhesive may be carried out employing conventional hot-melt adhesive applicators. In addition, coextrusion and thermoforming processes can be used.

The following examples serve to illustrate the spirit and scope of the invention and set forth the best mode contemplated by the inventor but are not to be construed as limiting.

TEST METHODS

The test methods used for evaluating the invention are as follows:

1. Softening points were determined by the method of ASTM-E 28-67 (ring and ball method).
2. T-Peel strengths were determined by ASTM test method D-1876-72.

PREPARATIONS 1-4

A series of four polyamide resins were prepared with the reactants given in Table 1.

TABLE 1

|  | Prep 1 Equiv % | Prep 2 Equiv % | Prep 3 Equiv % | Prep 4 Equiv % |
| --- | --- | --- | --- | --- |
| polymeric fatty acid* | 95 | 70 | 87.7 | 87.7 |
| sebacic acid | — | — | — | 12.3 |
| 1,18-octadecane-dicarboxylic acid** (SL-20 ®) | 5 | 30 | 12.3 | — |
| piperazine | 45 | 70 | 62.7 | 62.7 |
| ethylene diamine | 55 | 30 | 37.3 | 37.3 |

*Dimer-14; Union Camp Corporation, Wayne, New Jersey, having the composition:
monomer        0.4 wt %
dimer          95.6 wt %
trimer (and higher polymer)  4.0 wt %
**SL-20 ®, produced by Okamura Oil Mills Ltd. of Japan, contains 85–90% by weight 1,18-octadecane-dicarboxylic acid and 4–10% by weight of 1,14-dodecane-dicarboxylic acid.

The reactants were all charged in a resin kettle and refluxed at a temperature of 120°–150° C. with stirring, under a blanket of nitrogen gas for 3 hours. The mixture was then heated gradually from reflux temperature to 200° C. while water was removed by distillation. Six drops of phosphoric acid were added, and the mixture was heated at temperatures of 220°–240° C. under a vacuum of 0.05 to 5 mm Hg for 3 hours. The resulting polyamide resin was allowed to cool to room temperature and representative portions were taken and examined for physical properties.

EXAMPLES 1-6

Each of the polyamides prepared in accordance with Preparation 1-4 supra, as well as two commercial polyamide resins, were melted and applied to bond films of poly(vinylidene chloride) to itself or to films of poly(vinyl chloride). After cooling and adherence, the peel strength of the bond was tested for. The test results together with the softening point of each polyamide are given in Table 2, below. The poly(vinyl chloride)-poly(vinyl chloride) peel strengths are given in parentheses for comparison.

TABLE 2

| Poly(vinylidene Chloride)-Poly(vinylidene Chloride) Bonding* | | |
| --- | --- | --- |
| POLYAMIDE | SOFTENING POINT | PEEL STRENGTH (PLI) |
| Prep. 1 | 91 | 44 (21) |
| Prep. 2 | 115 | 87 (23) |
| Prep. 3 | 96 | 77 (29) |
| Prep. 4 | 96 | 92 (50) |
| Uni-Rez ® 2641 | 138 | 36 (26) |
| Uni-Rez ® 2645 | 138 | 38 (30) |

*Poly(vinylidene chloride) used was Saran ®.

As can be seen from the above examples, hot-melt polyamides made from either 1,18-octadecane dicarboxylic, sebacic, or azelaic acids show better adhesion to Saran ® than to poly(vinyl chloride) at room temperature.

The polyamide prepared from the 1,18-octadecane dicarboxylic acid is especially advantageous because its lower softening point causes less distortion of the Saran ®.

EXAMPLES 7-8

The procedure of Examples 1-6, supra., were repeated, using the commercial polyamides, except that the poly(vinylidene chloride) was bonded to poly(vinyl chloride). The test results are shown in Table 3, below.

TABLE 3

Poly(vinylidene Chloride)-Poly(Vinyl Chloride) Bonding*

| POLYAMIDE | PEEL STRENGTH (PLI) |
|---|---|
| Uni-Rez ® 2641 | 25 |
| Uni-Rez ® 2645 | 30 |

What is claimed is:

1. A method of bonding a first poly(vinylidene chloride) to a member selected from the group consisting of a second poly(vinylidene chloride), poly(vinyl chloride), polyethylene, polypropylene, polyolefins, polyesters and polyamides, which comprises;
   (a) interposing between the first poly (vinylidene chloride) and the selected member, a molten form of a polyamide adhesive consisting essentially of the amidification product of:
   (1) from 10-90 equivalent percent of a diamine selected from the group consisting of piperazine, 1,3-bis-(4-piperidyl)propane, and mixtures thereof,
   (2) from 10-90 equivalent percent of a diamine of the formula $H_2NR_4NH_2$ where $R_4$ is selected from the group consisting of aliphatic, cycloaliphatic and aromatic hydrocarbon radicals having from 2 to 20 carbon atoms,
   (3) from 0-20 equivalent percent of a diamine of the formula $H_2NR_5NH_2$ where $R_5$ is selected from the group consisting of polyoxyalkylene radicals,
   (4) from 40-95 equivalent percent of polymeric fat acid having a dimeric fat acid content greater than 65% by weight,
   (5) from 5-60 equivalent percent of a dicarboxylic acid selected from the group consisting of $R_2OOC$-$COOR_2$ and $R_2OOCR_3COOR_2$ where $R_2$ selected from the group consisting of hydrogen, alkyl and aryl groups containing from 1-8 carbon atoms and $R_3$ is a divalent, aliphatic, cycloaliphatic or aromatic hydrocarbon radical having from 1 to 20 carbon atoms; and
   (b) allowing the molten adhesive to solidify, whereby poly(vinylidene chloride) and the selected member are bonded together.

2. The method of claim 1 wherein the amidification product as defined is composed of the diamine (1) being from 40-80 equivalent percent of piperazine and the diamine (2) being from 20-60 equivalent percent of ethylenediamine or 1,6-hexamethylenediamine, and the diamine (3) being from 0-10 equivalent percent of polyglycoldiamine.

3. The method of claim 1 wherein the amidification product as defined is composed of the dicarboxylic acid (4) being azelaic acid.

4. The method of claim 1 wherein the amidification product as defined is composed of the dicarboxylic acid (4) being sebacic acid.

5. The method of claim 1 wherein the amidification product as defined is composed of the dicarboxylic acid (4) being 1,18-octadecanedicarboxylic acid.

6. The method of claim 1 wherein the amidification product as defined is composed of the dicarboxylic acid (4) being 1,16-hexadecanedicarboxylic acid.

7. The method of claim 1 wherein a coextrusion process is used for bonding the substrates with the amidification product.

8. The method of claim 1 wherein a thermoforming process is used for bonding the substrates with the amidification product.

* * * * *